Jan. 26, 1937.   J. Y. SNYDER, JR   2,068,876
SPRING EXPANSION BEND
Filed Nov. 21, 1933

John Y. Snyder, Jr. Inventor
W. E. Currie Attorney

Patented Jan. 26, 1937

2,068,876

UNITED STATES PATENT OFFICE 2,068,876

SPRING EXPANSION BEND

John Y. Snyder, Jr., Elizabeth, N. J., assignor to Standard Oil Development Company, a corporation of Delaware Application November 21, 1933, Serial No. 699,088

2 Claims. (Cl. 285—90)

This invention relates to an improved pipe expansion bend. The invention will be fully understood from the following description taken in connection with the accompanying drawing in which the latter—

Figure 1:
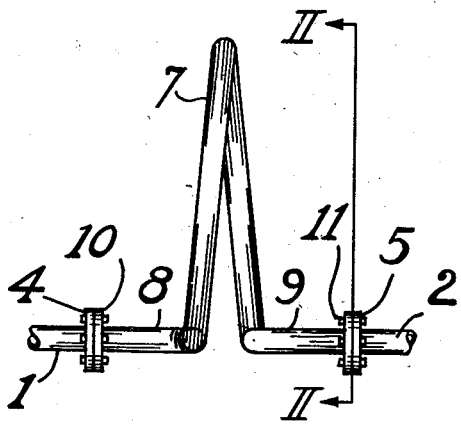
Fig. 1 is a side elevational view of the device.

Referring particularly to the drawing, reference numerals 1 and 2 designate respectively the ends of a pipe line. The pipe ends 1 and 2 are provided with suitable flanges 4 and 5 respectively.

Figure 2:
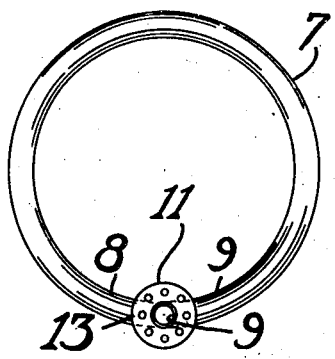
Fig. 2 is an end elevational view of the device looking along the line II—II of Fig. 1.

A spring expansion bend is disposed between the pipe ends 1 and 2. The spring expansion bend comprises a body portion 7 of tubing which is bent to form one or more turns of a coil. The body portion 7 is provided with ends 8 and 9 carrying flanges 10 and 11 respectively which are secured in any suitable manner to the pipe end flanges 4 and 5 respectively. The spring expansion bend is installed in the pipe line at right angles to the line of the pipe. The body portion 7 is in the shape of a helical spring with its ends 8 and 9 in alignment with each other, and extending substantially parallel with the longitudinal axis of the helical body portion, the spring bend of the body portion being disposed laterally of the ends 8 and 9 as can be clearly seen in Figs. 1 and 2. The flanged pipe ends 4 and 5 are secured to the flanges 10 and 11 of the spring expansion bend by suitable bolts 13 or the like. The body portion of the spring expansion bend is spiral in form.

Upon convergence or divergence of the pipe ends 1 and 2 due to expansion or contraction respectively of the pipe line, the spring expansion bend is caused to decrease or increase in length respectively according to the principle of a helical spring. By the construction described a large amount of expansion may be taken by one pipe bend with low resultant stresses in the material of the bend.

Figure 5:
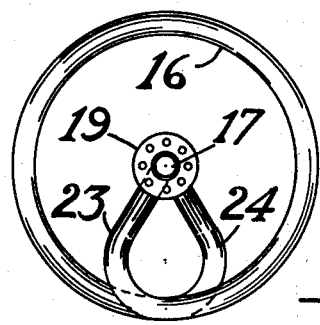
Fig. 5 is an end elevational view looking along the line V—V of Fig. 4.
Figure 3:
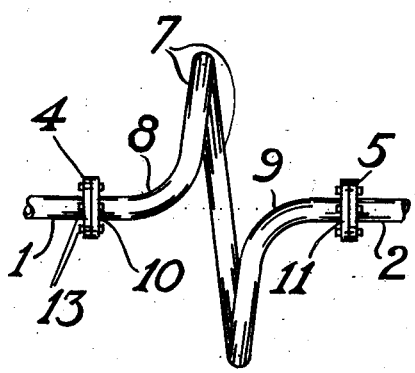
Fig. 3 is a bottom plan view of the device.
Figure 4:
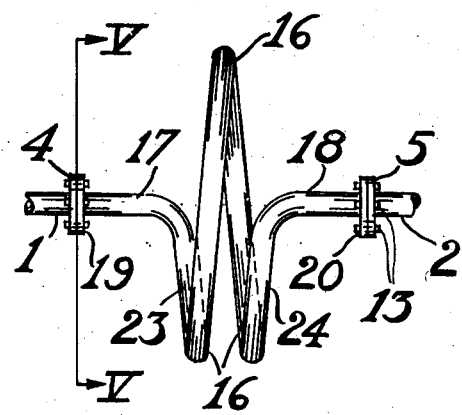
Fig. 4 is a side elevational view of a modified form of the device.

Referring to Figs. 4 and 5 a modified form of bend is shown comprising a body portion 16 in the shape of one or more turns of a coil. The body portion 16 has ends 17 and 18 carrying flanges 19 and 20, respectively, secured to the pipe end flanges 4 and 5 respectively. Portions 23 and 24 of the body portion 16 from which the ends 17 and 18 respectively protrude extend inwardly from the coil to substantially the center of the perimeter of the body portion.

Various changes may be made within the scope of the appended claims in which it is desired to claim all novelty inherent in the invention as broadly as the prior art permits.

I claim:

1. In a pipe line subject to variation in length due to temperature changes, a joint for two adjoining sections of the line consisting of a tubular body portion in the form of a portion of a helical coil having an axis substantially parallel to that of the adjoining pipe sections, end portions on said tubular body portion, at the perimeter thereof, extending outwardly therefrom in opposite directions, parallel to the axis of the body portion and adapted to engage the respective ends of the adjoining pipe sections, whereby variation of the length of the pipe line is compensated by an increase or decrease in the pitch of helical coil.

2. In a pipe line subject to variation in length due to temperature changes a joint for two adjoining sections of the line consisting of a tubular body portion in the form of a helical coil, having an axis concentric with that of the adjoining pipe sections, end portions on said tubular body portion extending outwardly in opposite directions along the axis of said body portion and adapted to engage the respective ends of the adjoining pipe sections whereby variation of the length of the pipe line is compensated by a corresponding change in pitch of the helical coil.

JOHN Y. SNYDER, Jr.